(12) United States Patent
Gore et al.

(10) Patent No.: US 8,339,930 B2
(45) Date of Patent: Dec. 25, 2012

(54) PILOT TRANSMISSION AND CHANNEL ESTIMATION WITH PILOT WEIGHTING

(75) Inventors: Dhananjay Ashok Gore, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1121 days.

(21) Appl. No.: 11/405,831

(22) Filed: Apr. 17, 2006

(65) Prior Publication Data

US 2006/0268676 A1   Nov. 30, 2006

Related U.S. Application Data

(60) Provisional application No. 60/681,586, filed on May 16, 2005, provisional application No. 60/710,618, filed on Aug. 22, 2005.

(51) Int. Cl.
*H04J 11/00* (2006.01)
(52) U.S. Cl. ......... 370/203; 370/491; 370/500; 375/144
(58) Field of Classification Search .................. 370/206, 370/210; 375/144, 148, 140, 147, 150
See application file for complete search history.

(56) References Cited

U.S. PATENT DOCUMENTS

| | | | | |
|---|---|---|---|---|
| 5,815,801 | A * | 9/1998 | Hamalainen et al. | 455/63.1 |
| 5,889,768 | A * | 3/1999 | Storm et al. | 370/320 |
| 6,141,393 | A * | 10/2000 | Thomas et al. | 375/347 |
| 6,493,330 | B1 * | 12/2002 | Miya et al. | 370/335 |
| 6,549,561 | B2 * | 4/2003 | Crawford | 375/137 |
| 6,567,374 | B1 * | 5/2003 | Bohnke et al. | 370/203 |
| 6,661,832 | B1 * | 12/2003 | Sindhushayana et al. | 375/144 |
| 6,826,240 | B1 * | 11/2004 | Thomas et al. | 375/340 |
| 6,853,839 | B2 * | 2/2005 | Usuda et al. | 455/276.1 |
| 6,917,642 | B1 * | 7/2005 | Rouphael et al. | 375/140 |
| 7,010,019 | B2 * | 3/2006 | Reial | 375/148 |
| 7,010,062 | B2 | 3/2006 | Joshi et al. | |

(Continued)

FOREIGN PATENT DOCUMENTS

JP     2003298547     10/2003

(Continued)

OTHER PUBLICATIONS

International Search Report, PCT/US06/018789, International Searching Authority, ISA/US—Alexandria, Virginia, Jul. 25, 2008.

(Continued)

*Primary Examiner* — Hassan Kizou
*Assistant Examiner* — Roberta A Shand
(74) *Attorney, Agent, or Firm* — Stanton Braden

(57) ABSTRACT

Techniques to perform channel estimation with pilot weighting are described. A receiver receives at least one transmission symbol for a pilot transmitted by a transmitter. Each transmission symbol may be generated with a single-carrier multiplexing scheme (e.g., IFDMA or LFDMA) or a multi-carrier multiplexing scheme (e.g., OFDMA). The receiver processes each received transmission symbol and obtains received pilot values. The receiver may derive an interference estimate based on the received pilot values and may estimate the reliability of the received pilot values based on the interference estimate. The receiver determines weights for the received pilot values based on the transmitted pilot values, the estimated reliability of the received pilot values, and/or other information. The receiver derives a channel estimate based on the received pilot values and the weights. The receiver then performs data detection (e.g., equalization) on received data values with the channel estimate.

34 Claims, 10 Drawing Sheets

U.S. PATENT DOCUMENTS

| | | | |
|---|---|---|---|
| 7,012,883 B2 * | 3/2006 | Jalali et al. | 370/208 |
| 7,016,319 B2 * | 3/2006 | Baum et al. | 370/329 |
| 7,103,119 B2 * | 9/2006 | Matsuoka et al. | 375/347 |
| 7,127,019 B2 * | 10/2006 | Koslov | 375/371 |
| 7,133,461 B2 * | 11/2006 | Thomas et al. | 375/295 |
| 7,385,617 B2 | 6/2008 | Tahat | |
| 7,532,664 B2 * | 5/2009 | Rimini et al. | 375/150 |
| 2002/0190880 A1 | 12/2002 | McLaughlin et al. | |
| 2003/0031130 A1 * | 2/2003 | Vanghi | 370/235 |
| 2003/0153277 A1 * | 8/2003 | Ito et al. | 455/69 |
| 2004/0013084 A1 | 1/2004 | Thomas et al. | |
| 2004/0013172 A1 * | 1/2004 | Hashiguchi et al. | 375/148 |
| 2004/0100897 A1 | 5/2004 | Shattil | |
| 2004/0190637 A1 * | 9/2004 | Maltsev et al. | 375/260 |
| 2005/0063378 A1 * | 3/2005 | Kadous | 370/389 |
| 2006/0047842 A1 * | 3/2006 | McElwain | 709/231 |
| 2006/0067421 A1 * | 3/2006 | Walton et al. | 375/267 |
| 2007/0098090 A1 | 5/2007 | Ma et al. | |
| 2008/0101487 A1 | 5/2008 | Muck et al. | |
| 2010/0184381 A1 * | 7/2010 | Zheng et al. | 455/63.1 |

FOREIGN PATENT DOCUMENTS

| | | |
|---|---|---|
| JP | 2004120709 | 4/2004 |
| JP | 2004172699 | 6/2004 |
| KR | 200397040 | 12/2003 |
| KR | 1020050008388 | 11/2005 |
| WO | WO2004030265 | 4/2004 |

OTHER PUBLICATIONS

Written Opinion, PCT/US06/018789, International Searching Authority, ISA/US, Alexandria, Virginia, Jul. 25, 2008.

International Preliminary Report on Patentability, PCT/US06/018789, The International Bureau of WIPO, Geneva, Switzerland, Mar. 3, 2009.

\* cited by examiner

PILOT TRANSMISSION AND CHANNEL ESTIMATION WITH PILOT WEIGHTING

CLAIM OF PRIORITY 35 U.S.C. §119

The present Application for Patent claims priority to Provisional Application No. 60/681,586 entitled "CHANNEL ESTIMATION ENHANCEMENT USING PILOT WEIGHTING" filed May 16, 2005, and Provisional Application No. 60/710,618 entitled "PILOT TRANSMISSION AND CHANNEL ESTIMATION WITH PILOT WEIGHTING" filed Aug. 22, 2005, both assigned to the assignee hereof and hereby expressly incorporated by reference herein.

BACKGROUND

I. Field

The present disclosure relates generally to communication, and more specifically to techniques for transmitting a pilot and for performing channel estimation in a communication system.

II. Background

In a wireless communication system, a transmitter typically encodes, interleaves, and modulates (or symbol maps) traffic data to obtain data symbols, which are modulation symbols for data. For a coherent system, the transmitter multiplexes pilot symbols with the data symbols, processes the multiplexed data and pilot symbols to generate a modulated signal, and transmits this signal via a wireless channel. The wireless channel distorts the transmitted signal with a channel response and further degrades the signal with noise and interference.

A receiver receives the transmitted signal and processes the received signal to obtain received data and pilot symbols. For coherent data detection, the receiver estimates the response of the wireless channel based on the received pilot symbols. The receiver then performs data detection (e.g., equalization) on the received data symbols with the channel estimate to obtain data symbol estimates, which are estimates of the data symbols transmitted by the transmitter. The receiver then demodulates, deinterleaves, and decodes the data symbol estimates to obtain decoded data for the transmitter.

The quality of the channel estimate has a large impact on data detection performance and affects the quality of the data symbol estimates as well as the reliability of the decoded data. There is therefore a need in the art for techniques to effectively perform channel estimation in a wireless communication system.

SUMMARY

Techniques to transmit a pilot in a single-carrier communication system and to perform channel estimation with pilot weighting in single-carrier and multi-carrier communication systems are described herein. The pilot transmission techniques may be used for single-carrier frequency division multiple access (SC-FDMA) schemes such as interleaved FDMA (IFDMA), localized FDMA (LFDMA), and enhanced FDMA (EFDMA). The channel estimation techniques may be used for SC-FDMA schemes and multi-carrier FDMA (MC-FDMA) schemes such as orthogonal frequency division multiple access (OFDMA). In general, modulation symbols are sent in the time domain with SC-FDMA and in the frequency domain with MC-FDMA.

In an embodiment, a transmitter forms a sequence of modulation symbols for a pilot. The sequence of modulation symbols is sent in the time domain and has a non-flat frequency response. The transmitter generates at least one transmission symbol for the sequence of modulation symbols based on an SC-FDMA scheme (e.g., IFDMA, LFDMA or EFDMA).

In an embodiment, a receiver receives at least one transmission symbol for a pilot transmitted by a transmitter. Each transmission symbol may be generated with an SC-FDMA scheme (e.g., IFDMA, LFDMA or EFDMA) or an MC-FDMA scheme (e.g., OFDMA). The receiver removes the cyclic prefix and performs a discrete Fourier transform (DFT) or a fast Fourier transform (FFT) on each received transmission symbol to obtain received pilot values. The receiver may derive an interference estimate based on the received pilot values and may estimate the reliability of the received pilot values based on the interference estimate. The receiver determines weights for the received pilot values based on the transmitted pilot values, the estimated reliability of the received pilot values, and/or other information. The receiver derives a channel estimate based on the received pilot values and the weights. The receiver may iteratively perform channel and interference estimation. If pilot and data are transmitted on different subbands, then the receiver may derive a channel estimate for the data subbands based on (1) the channel estimate for the pilot subbands or (2) the received pilot values and the weights. The receiver then performs data detection (e.g., equalization, match filtering, or receiver spatial processing) on received data values with the channel estimate.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
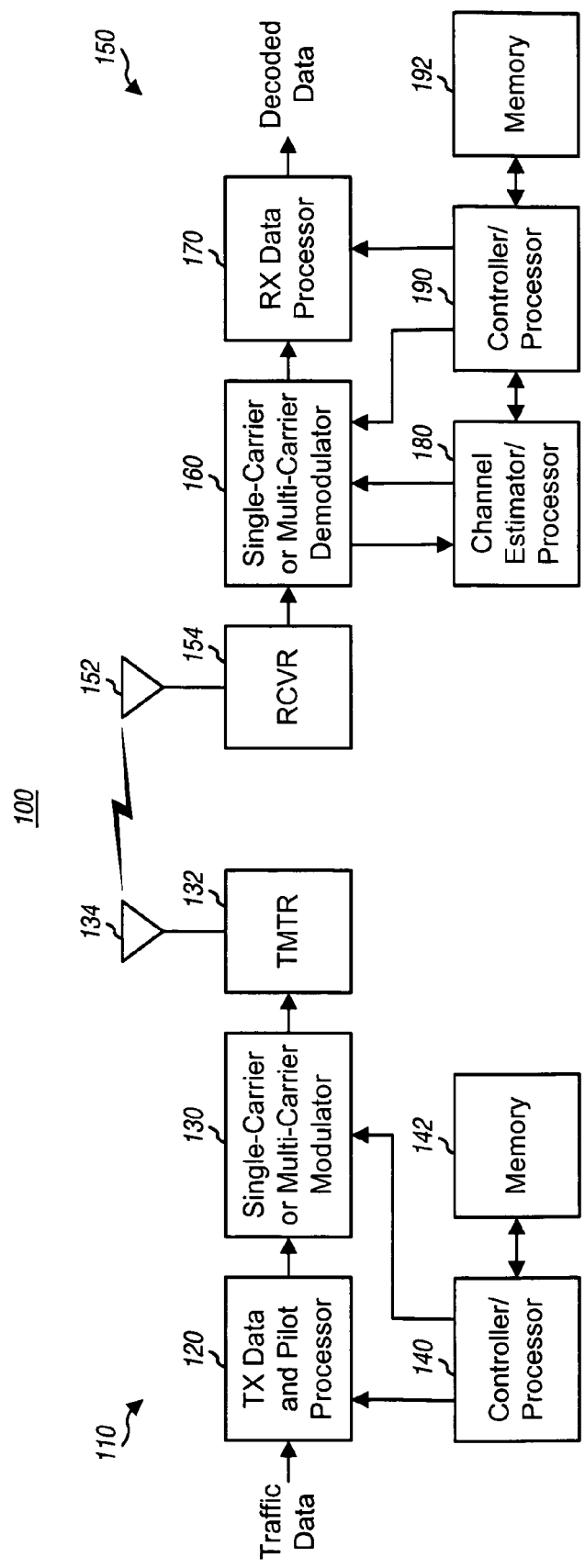
FIG. 1 shows a block diagram of a transmitter and a receiver.

FIG. 1 shows block diagram of a transmitter 110 and a receiver 150 in a wireless communication system 100. For simplicity, transmitter 110 and receiver 150 are each equipped with a single antenna. For the reverse link (or uplink), transmitter 110 may be part of a terminal, and receiver 150 may be part of a base station. For the forward link (or downlink), transmitter 110 may be part of a base station, and receiver 150 may be part of a terminal. A base station is generally a fixed station and may also be called a base transceiver system (BTS), an access point, a Node B, or some other terminology. A terminal may be fixed or mobile and may be a wireless device, a cellular phone, a personal digital assistant (PDA), a wireless modem card, and so on.

At transmitter 110, a transmit (TX) data and pilot processor 120 encodes, interleaves, symbol maps data (e.g., traffic data and signaling) and generates data symbols. Processor 120 also generates pilot symbols and multiplexes the data symbols and pilot symbols. As used herein, a data symbol is a modulation symbol for data, a pilot symbol is a modulation symbol for pilot, a modulation symbol is a complex value for a point in a signal constellation (e.g., for PSK or QAM), and a symbol is a complex value. A modulator 130 performs single-carrier or multi-carrier modulation on the data and pilot symbols and generates transmission symbols. A transmitter unit (TMTR) 132 processes (e.g., converts to analog, amplifies, filters, and frequency upconverts) the transmission symbols and generates a radio frequency (RF) modulated signal, which is transmitted via an antenna 134.

At receiver 150, an antenna 152 receives the RF modulated signal from transmitter 110 and provides a received signal to a receiver unit (RCVR) 154. Receiver unit 154 conditions (e.g., filters, amplifies, frequency downconverts, and digitizes) the received signal and provides input samples. A demodulator 160 performs single-carrier or multi-carrier demodulation on the input samples to obtain received data values and received pilot values. A channel estimator/processor 180 derives a channel estimate for transmitter 110 based on the received pilot values. Demodulator 160 further performs data detection (e.g., equalization or matched filtering) on the received data values with the channel estimate and provides data symbol estimates, which are estimates of the data symbols sent by transmitter 110. An RX data processor 170 symbol demaps, deinterleaves, and decodes the data symbol estimates and provides decoded data for transmitter 110. In general, the processing by receiver 150 is complementary to the processing by transmitter 110.

Controllers/processors 140 and 190 direct the operation of various processing units at transmitter 110 and receiver 150, respectively. Memories 142 and 192 store program codes and data for transmitter 110 and receiver 150, respectively.

System 100 may be a single-carrier system or a multiple-carrier system. A single-carrier system may utilize an SC-FDMA scheme such as IFDMA to transmit data and pilot on frequency subbands that are distributed across the overall system bandwidth, LFDMA to transmit data and pilot on a group of adjacent subbands, or EFDMA to transmit data and pilot on multiple groups of adjacent subbands. IFDMA is also called distributed FDMA, and LFDMA is also called narrowband FDMA or classical FDMA. A multi-carrier system may utilize an MC-FDMA scheme such as OFDMA. OFDMA utilizes orthogonal frequency division multiplexing (OFDM).

System 100 may utilize one or multiple multiplexing schemes for the forward and reverse links. For example, system 100 may utilize (1) SC-FDMA for both the forward and reverse links, (2) one version of SC-FDMA (e.g., LFDMA) for one link and another version of SC-FDMA (e.g., IFDMA) for the other link, (3) MC-FDMA for both the forward and reverse links, (4) SC-FDMA for one link (e.g., reverse link) and MC-FDMA for the other link (e.g., forward link), or (5) some other combination of multiplexing schemes. In general, system 100 may utilize one or multiple multiplexing schemes (e.g., SC-FDMA, or MC-FDMA, or a combination of SC-FDMA and MC-FDMA) for each link to achieve the desired performance. For example, SC-FDMA and OFDMA may be used for a given link, with SC-FDMA being used for some subbands and OFDMA being used on other subbands. It may be desirable to use SC-FDMA on the reverse link to achieve lower peak-to-average power ratio (PAPR) and to use OFDMA on the forward link to potentially achieve higher system capacity.

The pilot transmission and channel estimation techniques may be used for the forward and reverse links. The channel estimation techniques may be used for SC-FDMA (e.g., IFDMA, LFDMA, and EFDMA) as well as MC-FDMA (e.g., OFDMA).

Figure 2A:
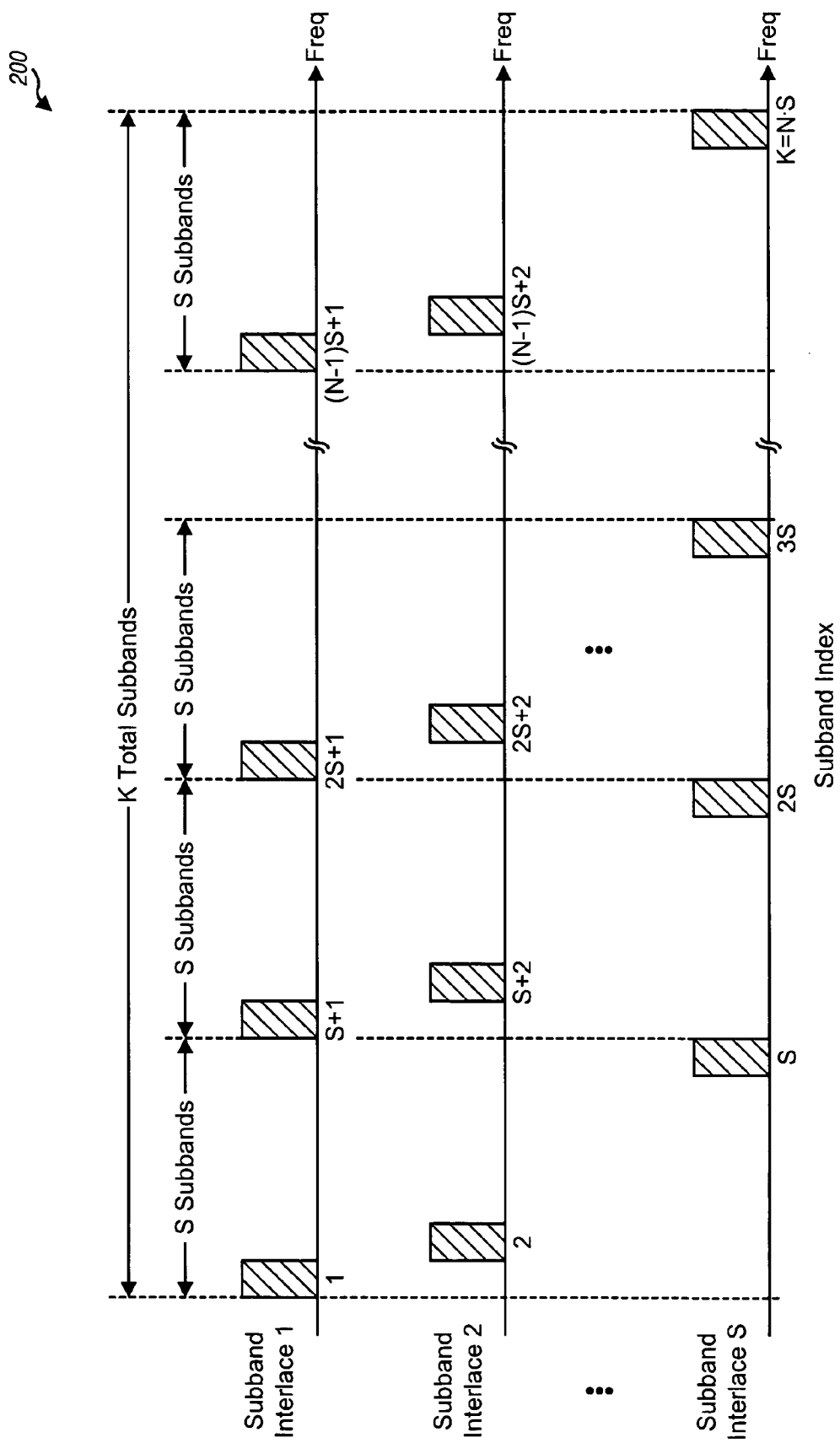
FIGS. 2A, 2B and 2C show three exemplary subband structures that may be used for SC-FDMA and MC-FDMA.

FIG. 2A shows an interlace subband structure 200 that may be used for SC-FDMA and MC-FDMA. The overall system bandwidth of BW MHz is partitioned into multiple (K) orthogonal subbands that are given indices of 1 through K, where K may be any integer value. The spacing between adjacent subbands is BW/K MHz. For simplicity, the following description assumes that all K total subbands are usable for transmission. For subband structure 200, the K subbands are arranged into S disjoint or non-overlapping interlaces. The S interlaces are disjoint in that each of the K subbands belongs in only one interlace. For subband structure 200, each interlace contains N subbands that are uniformly distributed across the K total subbands, consecutive subbands in each interlace are spaced apart by S subbands, and interlace u contains subband u as the first subband, where K=S·N and u∈{, 1, . . . , S}. In general, a subband structure may include any number of interlaces, each interlace may contain any number of subbands, and the interlaces may contain the same or different numbers of subbands. Furthermore, N may or may not be an integer divisor of K, and the N subbands may or may not be uniformly distributed across the K total subbands.

Figure 2B:
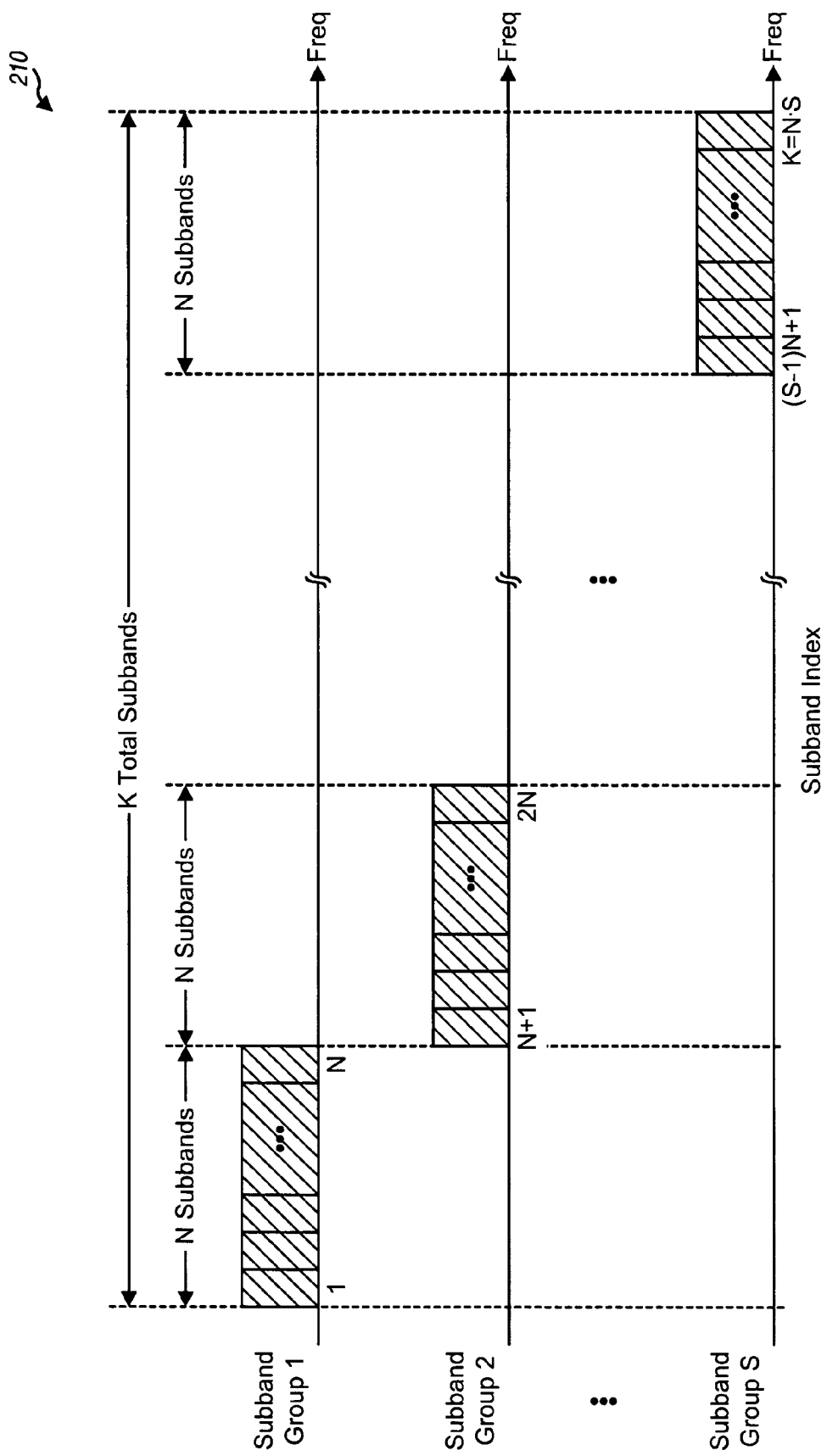

FIG. 2B shows a narrowband subband structure 210 that may also be used for SC-FDMA and MC-FDMA. For subband structure 210, the K total subbands are arranged into S non-overlapping groups, each group contains N adjacent subbands, and group v contains subbands (v−1)·N+1 through v·N, where K=S·N and v∈{1, . . . , S}. In general, a subband structure may include any number of groups, each group may contain any number of subbands, and the groups may contain the same or different numbers of subbands.

Figure 2C:
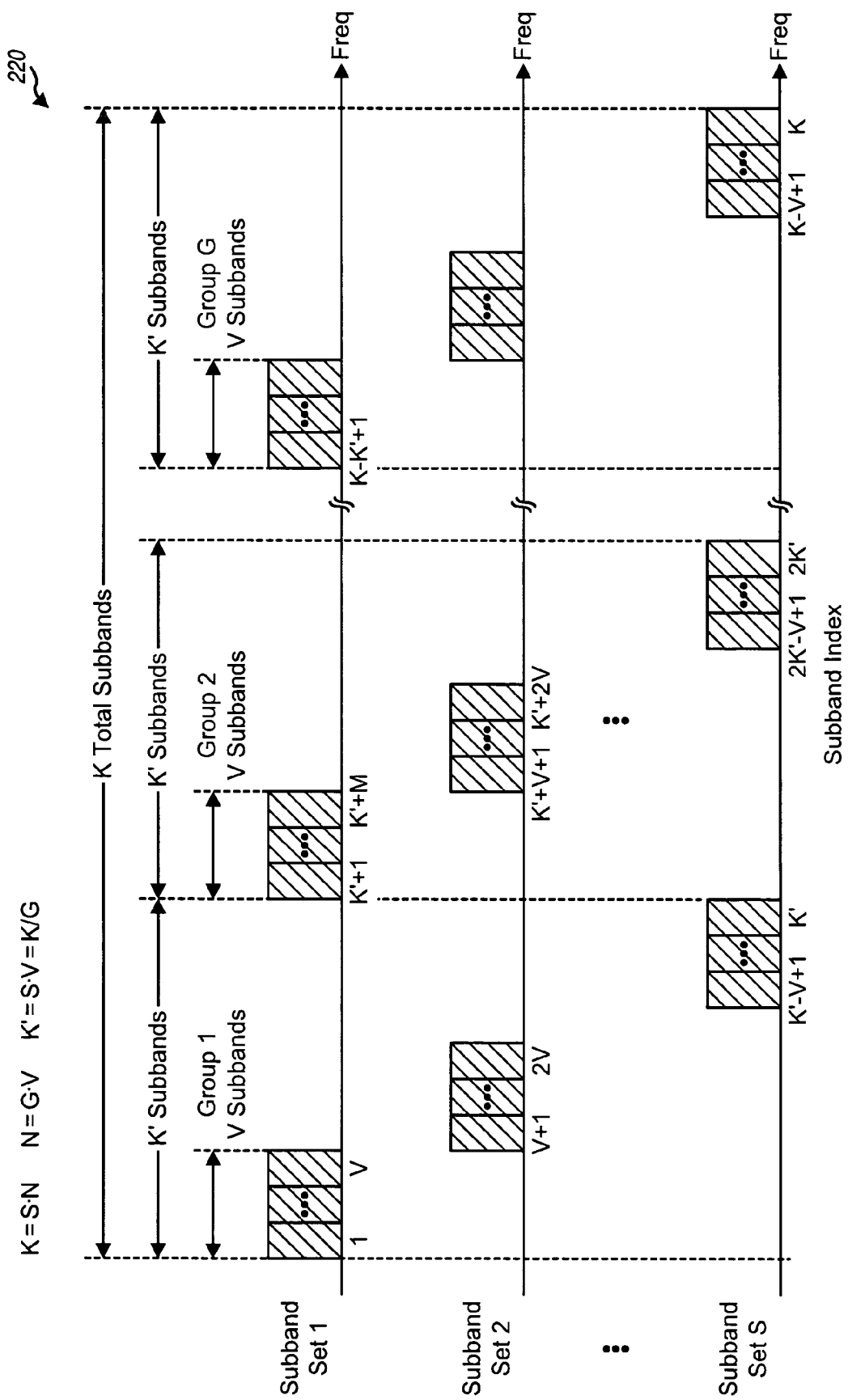

FIG. 2C shows another subband structure 220 that may also be used for SC-FDMA and MC-FDMA. For subband structure 220, the K total subbands are arranged into S non-overlapping sets, with each set including G groups of subbands. The K total subbands may be distributed to the S sets as follows. The K total subbands are first partitioned into multiple frequency ranges, with each frequency range containing K'=K/G consecutive subbands. Each frequency range is further partitioned into S groups, with each group including V adjacent subbands. For each frequency range, the first V subbands are allocated to set 1, the next V subbands are allocated to set 2, and so on, and the last V subbands are allocated to set S. Set s, for s=1, . . . , S, includes subbands having indices k that satisfy the following: (s−1)·V≦k modulo (K/G)<s·V. Each set contains G groups of V consecutive subbands, or a total of N=G·V subbands. In general, a subband structure may include any number of sets, each set may contain any number of groups and any number of subbands, and the sets may contain the same or different numbers of subbands. For each set, the groups may contain the same or different numbers of subbands and may be distributed uniformly or non-uniformly across the system bandwidth.

Subband structures 200, 210 and 220 may be used for SC-FDMA and MC-FDMA. For SC-FDMA, subband structures 200, 210 and 220 are used for IFDMA, LFDMA, and EFDMA, respectively. For SC-FDMA, a transmission symbol generated for one or more interlaces in FIG. 2A is called an IFDMA symbol, a transmission symbol generated for one or more subband groups in FIG. 2B is called an LFDMA symbol, and a transmission symbol generated for one or more subband sets in FIG. 2C is called an EFDMA symbol. For MC-FDMA, subband structures 200, 210 and 220 may be used for OFDMA, and a transmission symbol generated for one or more interlaces, one or more subband groups, or one or more subband sets for OFDMA is called an OFDM symbol. A transmission symbol may thus be an SC-FDMA symbol generated with an SC-FDMA scheme or an MC-FDMA symbol generated with an MC-FDMA scheme. An SC-FDMA symbol may be an IFDMA symbol, an LFDMA symbol, or an EFDMA symbol. An MC-FDMA symbol may be an OFDM symbol.

As generically used herein, a subband set is a set of subbands, which may be an interlace for subband structure 200, a subband group for subband structure 210, a set of multiple subband groups for subband structure 220, and so on. For each symbol period, multiple (N) modulation symbols may be sent on a subband set in either the time domain with SC-FDMA or the frequency domain with MC-FDMA. In general, the techniques described herein may be used for any subband structure with any number of subband sets and where each subband set may include any number of subbands that may be arranged in any manner. For each subband set, (1) the subbands may be individually and either uniformly or non-uniformly distributed across the system bandwidth, (2) the subbands may be adjacent to one another in one group, or (3) the subbands may be distributed in multiple groups, where each group may be located anywhere in the system bandwidth and may contain one or multiple subbands.

Figure 3A:
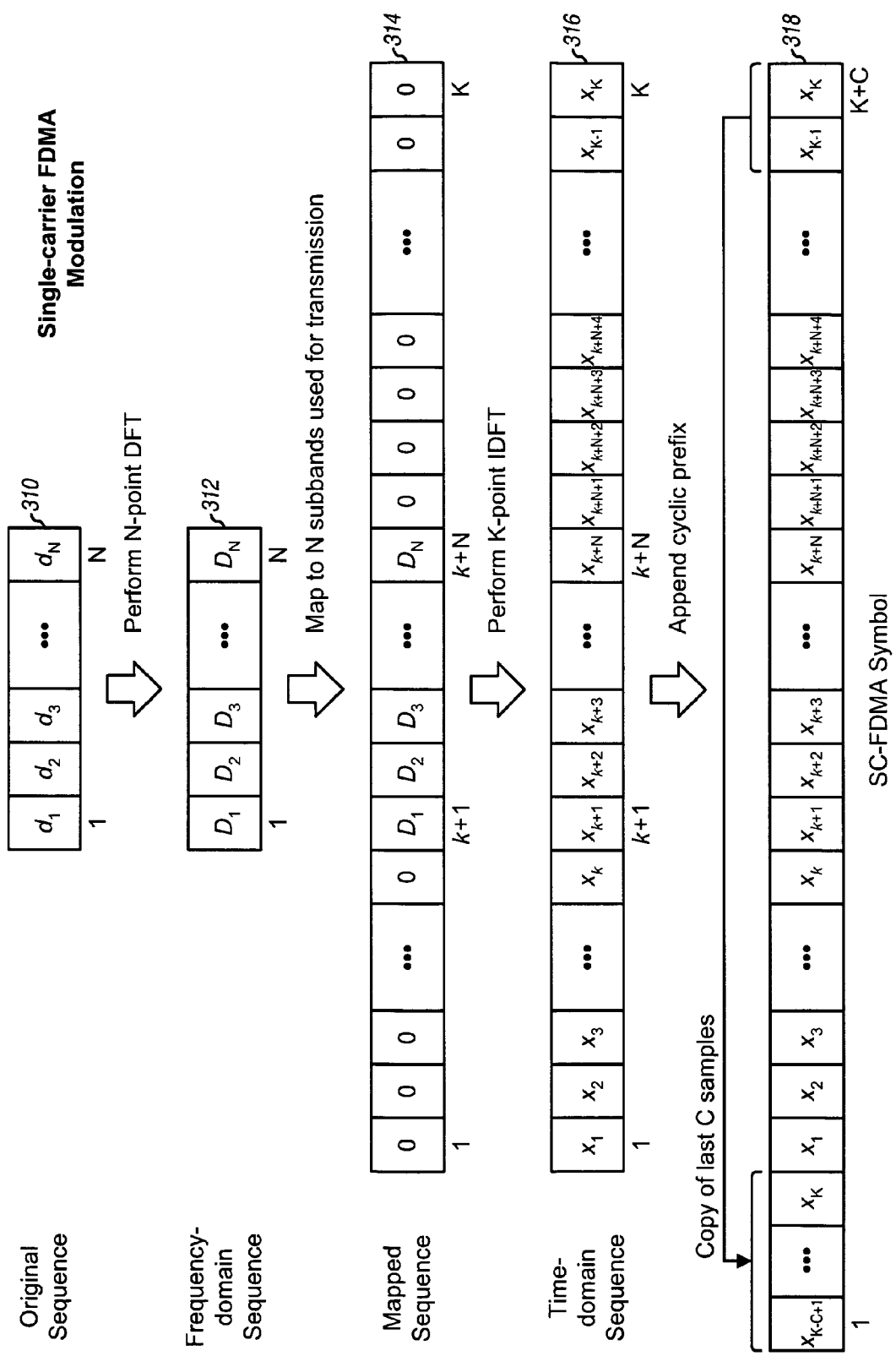
FIG. 3A shows the generation of an SC-FDMA symbol.

FIG. 3A shows the generation of an SC-FDMA symbol. An original sequence of N modulation symbols to be transmitted in the time domain on N subbands in one symbol period is denoted as $\{d_1, d_2, d_3, \ldots, d_N\}$ (block 310). The original sequence is transformed to the frequency domain with an N-point DFT/FFT to obtain a sequence of N frequency-domain values (block 312). The N frequency-domain values are mapped onto the N subbands used for transmission, and zero values are mapped onto the remaining K−N subbands to generate a sequence of K values (block 314). The N subbands used for transmission may belong in one group of subbands for LFDMA (as shown in FIG. 3A), one interlace for IFDMA (not shown in FIG. 3A), or one set of multiple subband groups for EFDMA (also not shown in FIG. 3A). The sequence of K values is transformed to the time domain with a K-point IDFT/IFFT to obtain a sequence of K time-domain output samples (block 316). The last C output samples of the sequence are copied to the start of the sequence to form an SC-FDMA symbol that contains K+C output samples (block 318). The C copied output samples are often called a cyclic prefix or a guard interval, and C is the cyclic prefix length. The cyclic prefix is used to combat intersymbol interference (ISI) caused by frequency selective fading.

Figure 3B:
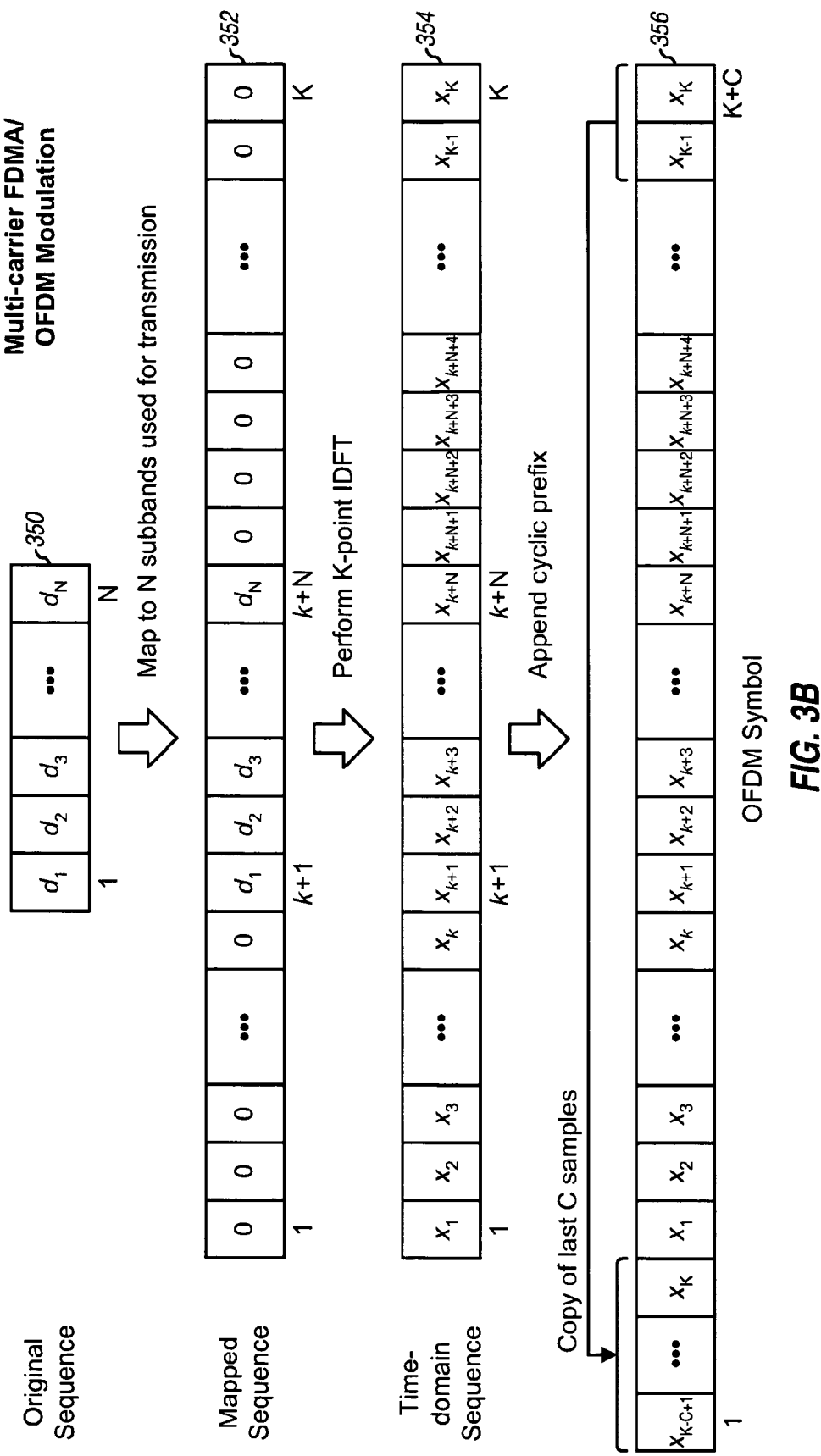
FIG. 3B shows the generation of an MC-FDMA symbol.

FIG. 3B shows the generation of an MC-FDMA symbol. An original sequence of N modulation symbols to be transmitted in the frequency domain on N subbands in one symbol period is denoted as $\{d_1, d_2, d_3, \ldots, d_N\}$ (block 350). The N modulation symbols are mapped onto the N subbands used for transmission, and zero values are mapped onto the remaining K−N subbands to generate a sequence of K values (block 352). The N subbands used for transmission may belong in one interlace in FIG. 2A, one subband group in FIG. 2B, or one subband set in FIG. 2C. The sequence of K values is transformed to the time domain with a K-point IDFT/IFFT to obtain a sequence of K time-domain output samples (block 354). The last C output samples of the sequence are copied to the start of the sequence to form an MC-FDMA symbol that contains K+C output samples (block 356).

SC-FDMA symbols and MC-FDMA symbols may also be generated in other manners.

Figure 4A:
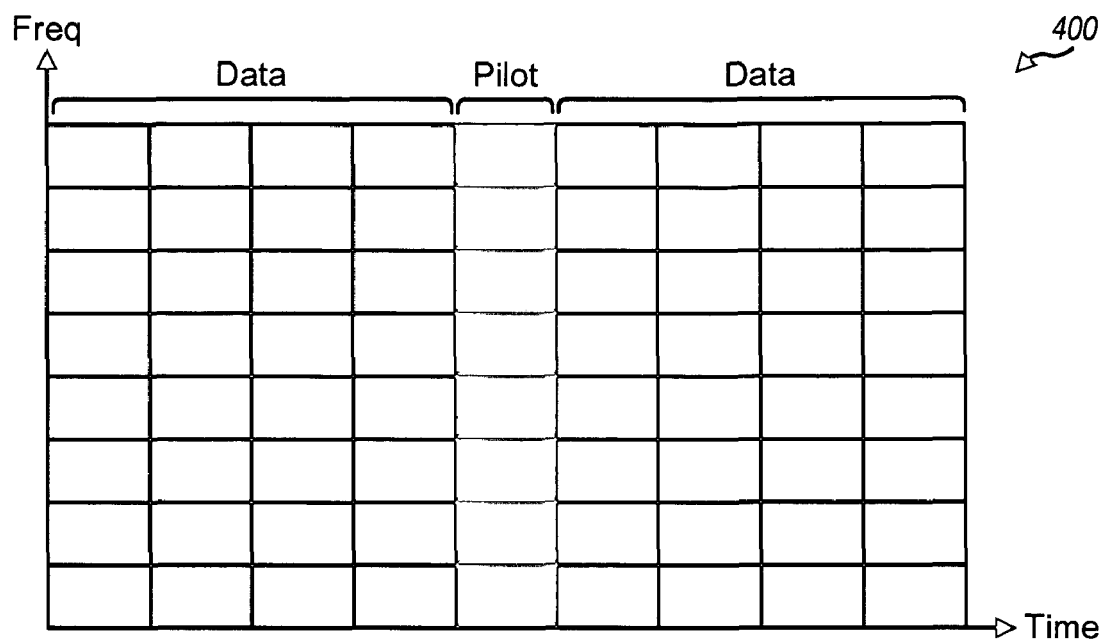
FIGS. 4A and 4B show two exemplary data and pilot transmission schemes.

FIG. 4A shows a transmission scheme 400 that may be used for SC-FDMA and MC-FDMA. For transmission scheme 400, a transmitter transmits data and pilot using time division multiplexing (TDM). The transmitter transmits data on T subbands for some number of symbol periods, then pilot on the T subbands for at least one symbol period, then data on the T subbands for some number of symbol periods, and so on. The T subbands may be for one or more interlaces in FIG. 2A, one or more subband groups in FIG. 2B, one or more subband sets in FIG. 2C, some other subset of the K total subbands, or all K total subbands.

Figure 4B:
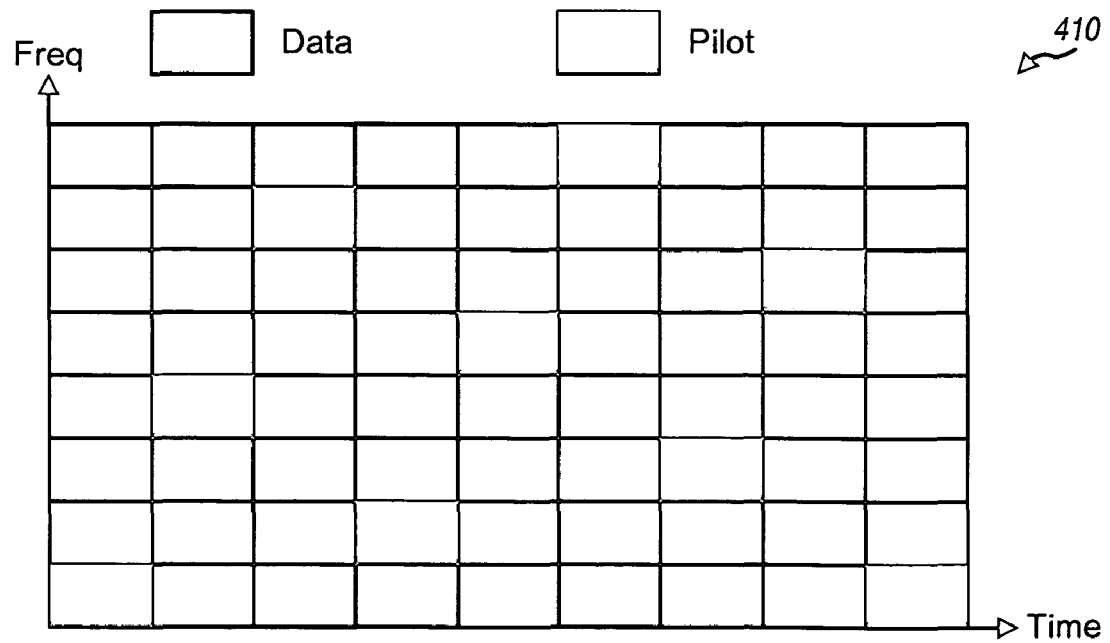

FIG. 4B shows another transmission scheme 410 that may also be used for SC-FDMA and MC-FDMA. For transmission scheme 410, a transmitter transmits data and pilot using frequency division multiplexing (FDM) on T subbands. The transmitter transmits data on D subbands and transmits pilot on P subbands, where T=D+P. The subbands used for data transmission are called data subbands, and the subbands used for pilot transmission are called pilot subbands. The D data subbands and the P pilot subbands may be for one or more interlaces in FIG. 2A, one or more subband groups in FIG. 2B, one or more subband sets in FIG. 2C, some other subset of the K total subbands, or all K total subbands.

The data and pilot subbands may change over time (e.g., as shown in FIG. 4B) to allow a receiver to estimate the frequency response across all or most of the system bandwidth over time. Alternatively, the data and pilot subbands may be static (not shown in FIG. 4B).

In general, the transmitter may transmit on any number of subbands and may transmit data and pilot on the same or different subbands. Furthermore, the transmitter may transmit a common pilot to multiple receivers and/or a dedicated pilot to a specific receiver. The term "pilot" thus generically covers both common pilot and dedicated pilot. The receiver may derive a channel estimate for the data subbands based on a pilot received on the pilot subbands. The receiver may use the channel estimate to recover the data sent on the data subbands.

The receiver may receive a transmission symbol from the transmitter in each symbol period. For each received transmission symbol, the receiver removes the cyclic prefix to obtain K input samples, performs a K-point DFT/FFT on the K input samples to obtain K frequency-domain received values, retains the received values for the T subbands used by the transmitter, and discards the remaining received values. For each received transmission symbol, the receiver obtains received pilot values for pilot subbands (if any) and received data values for data subbands (if any). The received pilot values are also called pilot observations.

The received pilot values for a symbol period with pilot transmission may be expressed as:

$$R_p(k) = P(k) \cdot H(k) + N(k), \text{ for } k \in K_p, \qquad \text{Eq (1)}$$

where
  $P(k)$ is a transmitted pilot value for subband k;
  $H(k)$ is a complex gain for the wireless channel for subband k;
  $R_p(k)$ is a received pilot value for subband k;
  $N(k)$ is the noise and interference for subband k; and
  $K_p$ is the set of P pilot subbands.

The received pilot values may be expressed in vector and matrix form as follows:

$$r_p = W \cdot h_p + n, \qquad \text{Eq (2)}$$

where $r_p$ is a P×1 vector containing P received pilot values for the P pilot subbands;

W is a P×P diagonal matrix containing the P transmitted pilot values;

$h_p$ is a P×1 vector containing the channel gains for the P pilot subbands; and n is a P×1 vector of noise and interference for the P pilot subbands.

Matrix W may be defined to contain the P transmitted pilot values along the diagonal and zeros elsewhere, or diag{W}= [P(1), P(2), ..., P(P)].

The wireless channel between the transmitter and the receiver may be characterized by either a time-domain channel impulse response or a frequency-domain channel frequency response. The channel impulse response may comprise L time-domain taps, $h_1, h_2, \ldots, h_L$, where L is typically much less than the number of pilot subbands, or L<P. The channel frequency response is the DFT of the channel impulse response and may be expressed as:

$$h_p = Q \cdot h, \qquad \text{Eq (3)}$$

where

Q is a P×L Fourier submatrix; and h is an L×1 vector containing L channel taps for the channel impulse response.

A K×K Fourier matrix F contains K rows for the K total subbands and K columns for K time-domain samples. The (k,n)-th element of matrix F, $f_{k,n}$, is defined as:

$$f_{k,n} = e^{-j2\pi(k-1)\cdot(n-1)/K}, \text{ for } k=1,\ldots,K \text{ and } n=1,\ldots,K. \qquad \text{Eq (4)}$$

Submatrix Q contains P rows of the Fourier matrix F corresponding to the P pilot subbands and the first L elements of these P rows.

The received pilot values may also be expressed as:

$$r_p = W \cdot Q \cdot h + n. \qquad \text{Eq (5)}$$

Equation (5) is obtained by substituting equation (3) into equation (2).

For MC-FDMA, P pilot symbols may be sent on the P pilot subbands, one pilot symbol on each subband. Each transmitted pilot value is then equal to one pilot symbol. The pilot symbols may be selected based on a modulation scheme (e.g., a phase shift keying (PSK) scheme such as BPSK or QPSK) that provides modulation symbols having a constant amplitude. In this case, the pilot symbols would have a constant envelope in frequency (i.e., a flat frequency response), and |P(k)|=1 for all values of k.

For SC-FDMA, P pilot symbols may be transformed with a DFT/FFT as shown in FIG. 3A to obtain P frequency-domain pilot values, which are then sent on the P pilot subbands, one pilot value on each subband. Even if the pilot symbols have a constant envelope in time, the resultant pilot values may not have a constant envelope in frequency due to the DFT/FFT operation. Hence, |P(k)| may not be equal to 1 for all values of k.

Matrix W accounts for the frequency-domain envelope of the transmitted pilot values. The diagonal elements of W may have different amplitudes if the transmitted pilot has a non-constant envelope in frequency, i.e., a non-flat frequency response.

The receiver may derive a channel estimate based on the received pilot values. This channel estimate may be a channel impulse response estimate or a channel frequency response estimate. The receiver may derive the channel estimate using various techniques such as a least squares (LS) technique, minimum mean square error (MMSE) technique, and so on.

A channel impulse response estimate may be derived based on the least squares technique, as follows:

$$\hat{h}_{ls} = [Q^H \cdot W^H \cdot W \cdot Q]^{-1} \cdot Q^H \cdot W^H \cdot r_p, \qquad \text{Eq (6)}$$

where $\hat{h}_{ls}$ is a least-squares estimate of h, and "$^H$" denotes a conjugate transpose.

A channel impulse response estimate may also be derived based on the MMSE technique, as follows:

$$\hat{h}_{mmse} = [Q^H \cdot W^H \cdot W \cdot Q + \Lambda]^{-1} \cdot Q^H \cdot W^H \cdot r_p, \qquad \text{Eq (7)}$$

where $\Lambda$ is a P×P covariance matrix of the noise and interference; and $\hat{h}_{mmse}$ is an MMSE estimate of h.

The covariance matrix may be given as $\Lambda = E\{n \cdot n^H\}$, where E{ } denotes an expectation operation. The noise and interference may be assumed to be additive white Gaussian noise (AWGN) with a zero mean vector and a covariance matrix of $\Lambda = \sigma_n^2 \cdot I$, where $\sigma_n^2$ is the variance or power of the noise and interference and I is the identity matrix.

Equations (6) and (7) may be implemented with DFT and IDFT operations, or FFT and IFFT operations if P and L are powers of two. Each matrix multiplication with Q may be performed with a DFT or FFT, and each matrix multiplication with $Q^H$ may be performed with an IDFT or IFFT. The channel impulse response estimate $\hat{h}_{ls}$ or $\hat{h}_{mmse}$ may be used to derive a channel frequency response estimate for the data subbands or for all K total subbands. For example, the channel impulse response estimate $\hat{h}_{ls}$ or $\hat{h}_{mmse}$ may be processed, e.g., to truncate some of the L channel taps, to zero out channel taps with low energy, and so on. The processed channel impulse response estimate may be zero padded to length K and then transformed with a K-point DFT/FFT to obtain a channel frequency response estimate for the K total subbands, as follows:

$$\hat{h} = F \cdot \hat{h}, \qquad \text{Eq (8)}$$

where $\hat{h}$ is a K×K vector for the padded channel impulse response estimate; and $\hat{h}$ is a K×K vector for the channel frequency response estimate.

A channel frequency response estimate for the pilot subbands may also be derived based on the least squares technique, as follows:

$$\hat{h}_{ls,p} = R_{pp} \cdot W^H [W \cdot R_{pp} \cdot W^H]^{-1} \cdot r_p, \qquad \text{Eq (9)}$$

where $R_{pp}$ is a P×P covariance matrix for the channel response vector $h_p$; and $h_{ls,p}$ is a least-squares estimate of $h_p$, The covariance matrix $R_{pp}$ may be expressed as:

$$R_{pp} = E\{h_p \cdot h_p^H\}. \qquad \text{Eq (10)}$$

The covariance matrix $R_{pp}$ contains complex values and may be determined based on a model for the wireless channel, computer simulation, empirical measurement, and so on. For example, the channel model may make certain assumptions about delay spread and/or Doppler for the wireless channel, and these assumptions may be used to obtain $R_{pp}$.

A channel frequency response estimate for the pilot subbands may also be derived based on the MMSE technique, as follows:

$$\hat{h}_{mmse,p} = R_{pp} \cdot W^H \cdot [W \cdot R_{pp} \cdot W^H + \Lambda]^{-1} \cdot r_p, \qquad \text{Eq (11)}$$

where $\hat{h}_{mmse,p}$ is an MMSE estimate of $h_p$.

If the data subbands are the same as the pilot subbands (e.g., for transmission scheme 400 shown in FIG. 4A), then the channel estimate for the pilot subbands may be used directly for equalization, match filtering, and so on. If the data subbands are different from the pilot subbands (e.g., for transmission scheme 410 shown in FIG. 4B), or even if the data subbands and the pilot subbands are the same, a channel estimate may be derived for the data subbands based on either the channel estimate for the pilot subbands or the received pilot values and the weights.

The frequency response for the P pilot subbands may be given by the P×1 vector $h_p$, and the frequency response for the D data subbands may be given by a D×1 vector $h_d$. A D×P covariance matrix $R_{dp}$ may be defined as:

$$R_{dp} = E\{h_d \cdot h_p^H\}. \qquad \text{Eq (12)}$$

The covariance matrix $R_{dp}$ may also be determined based on a model for the wireless channel, computer simulation, empirical measurement, and so on. $R_{dp}$ captures variation in time as well, so that a channel estimate for the data subbands may be different than the channel estimate for the pilot subbands even if the data subbands are the same as the pilot subbands.

A channel frequency response estimate for the data subbands may be derived based on the least squares technique, as follows:

$$\hat{h}_{ls,d} = R_{dp} \cdot W^H \cdot [W \cdot R_{pp} \cdot W^H]^{-1} \cdot r_p, \qquad \text{Eq (13)}$$

where $\hat{h}_{ls,d}$ is a least squares estimate of $h_d$.

A channel frequency response estimate for the data subbands may also be derived based on the MMSE technique, as follows:

$$\hat{h}_{mmse,d} = R_{dp} \cdot W^H \cdot [W \cdot R_{pp} \cdot W^H + \Lambda]^{-1} \cdot r_p, \qquad \text{Eq (14)}$$

where $\hat{h}_{mmse,d}$ is an MMSE estimate of $h_d$.

In equations (6) through (14), the channel estimates are derived with matrix W, which performs pilot weighting. In particular, the received pilot values for different subbands are weighted based on the transmitted pilot values. The received pilot values corresponding to transmitted pilot values with larger magnitudes are given more weight in the channel estimation, and the received pilot values corresponding to transmitted pilot values with smaller magnitudes are given less weight. This pilot weighting may result in a higher quality channel estimate.

The channel estimation may also be performed based on the reliability or quality of the received pilot values. The noise and interference observed by the receiver may not be constant across all of the pilot subbands. This may be the case, for example, if an interfering transmitter (e.g., a transmitter in another sector or cell) transmits on only some of the pilot subbands, if the interfering transmitter uses different transmit powers for different pilot subbands, if the frequency response for the interfering transmitter is not flat across the pilot subbands, if different interfering transmitters transmit on different subsets of the pilot subbands, and so on. In any case, the noise and interference power may vary across the pilot subbands, which implies that some received pilot values are less reliable than others.

An interference estimate may be derived as follows:

$$\hat{I}(k) = |R_p(k) - P(k) \cdot \hat{H}(k)|^2, \text{ for } k \in K_p, \qquad \text{Eq (15)}$$

where $\hat{I}(k)$ is the estimated noise and interference power for subband k (or simply, the estimated interference power) and $\hat{H}(k)$ is a channel gain estimate for subband k. The interference estimate may comprise an $\hat{I}(k)$ value for each pilot subband. Each $\hat{I}(k)$ value may also be obtained by averaging over multiple subbands and/or multiple symbol periods.

The channel gain estimate in equation (14) may be derived as described above, e.g., as shown in equation (9) or (11). Alternatively, the channel gain estimate may be derived for each subband k based on the MMSE technique, as follows:

$$\hat{H}(k) = \frac{R_p(k) \cdot P^*(k)}{|P(k)|^2 + \hat{N}_0}, \qquad \text{Eq (16)}$$

for $k \in K_p$, where $\hat{N}_0$ may be an initial estimate, an average estimate, or a long-term estimate of the noise and interference and "*" denotes a complex conjugate.

An interference estimate may also be obtained by projecting the received pilot values on orthogonal dimensions. The receiver obtains P received pilot values for P pilot subbands. These P received pilot values constitute a vector in P-dimensional space and may, in principle, be used to estimate P parameters about the wireless channel. If there are L parameters for the wireless channel, then L dimensions of the P-dimensional vector may be used to estimate these P parameters, and P−L dimensions are available for interference estimation. A P×P unitary matrix may be defined as $V = [v_1, v_2, \ldots, v_P]$, where $v_j$, for $j \in \{1, \ldots, P\}$, is a P×1 vector/column. The unitary matrix V is characterized by the property $V^H \cdot V = I$, which means that the columns of V are orthogonal to one another and each column has unit power. The unitary matrix V may be generated based on a channel model so that the channel variations are constrained to the first L columns of V. The last P−L columns of V may then be used for interference estimation since the channel is not present in these dimensions. The received vector $r_p$ may be projected onto each of the P−L vectors in V as $r_p^H \cdot v_j$. The estimated interference power for each subband k may then be obtained by averaging across the different projections, as follows:

$$\hat{I}(k) = \frac{1}{P-L} \cdot \sum_{j=P-L+1}^{P} R_p^*(k) \cdot V_j(k), \qquad \text{Eq (17)}$$

for $k \in K_p$, where $V_j(k)$ is the element for subband k in vector $v_j$.

Regardless of how the interference estimate is derived, a reliability weight may be defined for each pilot subband based on the estimated interference power for that subband, as follows:

$$W(k) = f\{\hat{I}(k)\}, \text{ for } k \in K_p, \qquad \text{Eq (18)}$$

where $f\{\hat{I}(k)\}$ is a function that gives a larger weight for a smaller value of $\hat{I}(k)$ and a smaller weight for a larger value of $\hat{I}(k)$. For example, the function may be defined as $f\{\hat{I}(k)\} = \alpha / \hat{I}(k)$, where $\alpha$ is a constant value for all pilot subbands.

The reliability weights may also be determined based on other information such as, e.g., knowledge of the interfering transmitters, knowledge of the channel conditions, and so on. For example, smaller weights may be given to subbands used by a strong interfering transmitter. The reliability weights may also be determined based on known information (e.g., for the interfering transmitter) without having to actually compute an interference estimate.

A P×P diagonal matrix $W_I$ may be defined for the reliability of the P pilot subbands. For example, matrix $W_I$ may contain the reliability weights for the P pilot subbands along the diagonal and zeros elsewhere, or diag$\{W_I\}$=[W(1), W(2), ..., W(P)]. Matrix $W_I$ may then be used to derive a channel estimate, e.g., using any of the channel estimation equations given above, albeit with $W_I$ replacing W. Matrix $W_I$ would then perform reliability weighting and would give received pilot values with higher reliability more weight in the channel estimation and give received pilot values with less reliability less weight. This reliability weighting may result in a higher quality channel estimate.

A P×P diagonal matrix $W_{p,I}$ may also be defined based on the transmitted pilot values and the reliability weights. For example, the diagonal elements of matrix $W_{p,I}$ may be defined as diag$\{W_{p,I}\}$=[W(1)·P(1), W(2)·P(2), ..., W(P)·P(P)]. Matrix $W_{p,I}$ may then be used to derive a channel estimate, e.g., using any of the channel estimation equations given above, albeit with $W_{p,I}$ replacing W.

The interference estimate may also be used to derive covariance matrix Λ, which is used to compute an MMSE channel estimate. In general, covariance matrix Λ may be derived based on a short-term or a long-term average of the interference estimate, a channel model, and so on.

The channel gain estimates may be used to derive an interference estimate, e.g., as shown in equation (14). Reliability weights may then be defined based on the interference estimate and used to derive the channel gain estimates. The channel estimation and interference estimation may be iteratively performed to improve the quality of the channel and interference estimates.

Iterative channel and interference estimation may be performed as follows:
a. Determine an initial interference estimate.
b. Compute reliability weights based on the initial interference estimate.
  1. Compute matrix $W_{p,I}$ based on the transmitted pilot values and the reliability weights.
  2. Derive a channel estimate based on the received pilot values and matrix $W_{p,I}$.
  3. Derive an interference estimate based on the received pilot values and the channel estimate.
  4. Compute reliability weights based on the interference estimate.
  5. Repeat steps 1 through 4 until a termination condition is encountered.

Steps a and b are performed once. The iterative process may terminate after a predetermined number of iterations.

Figure 5A:
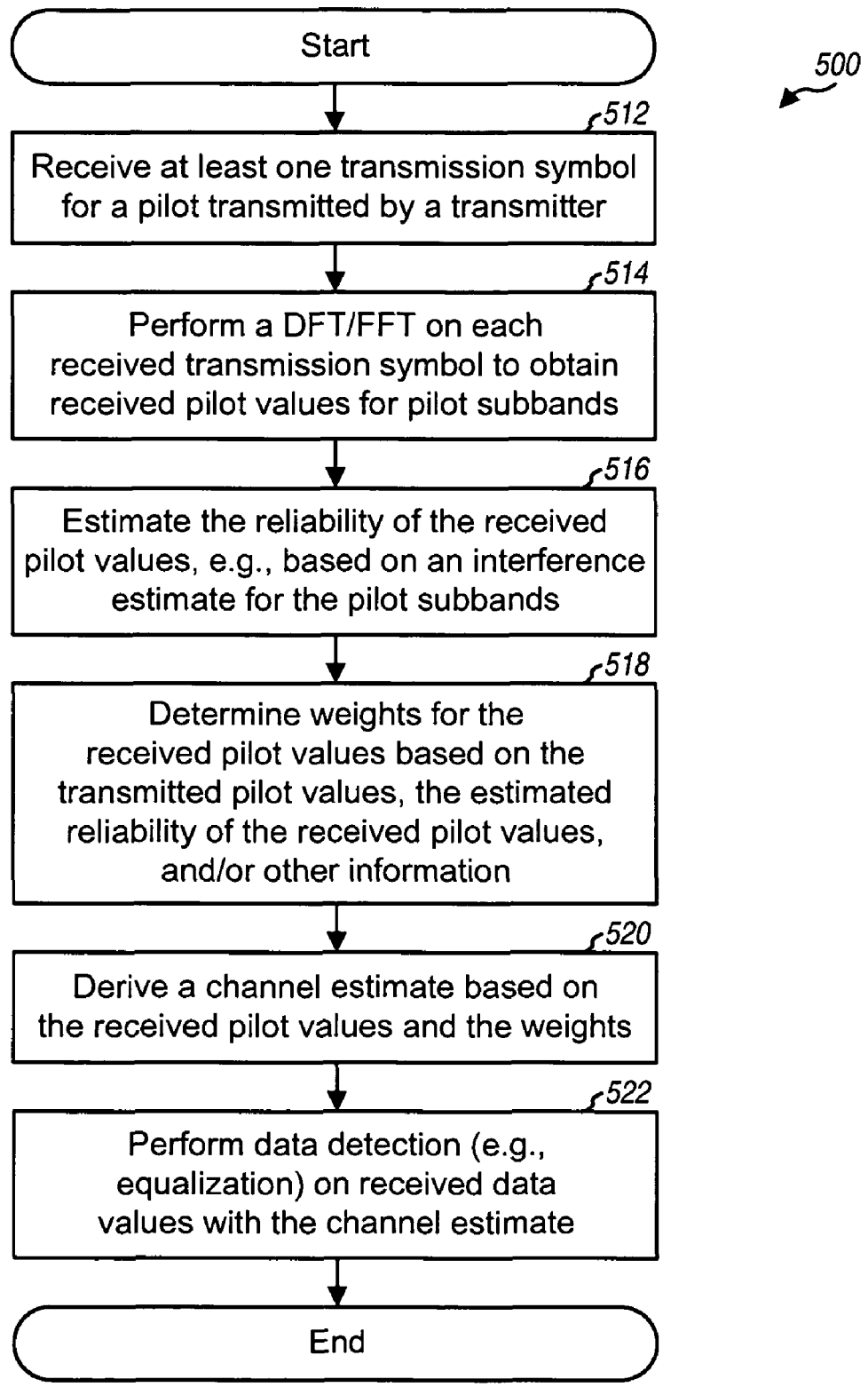
FIG. 5A shows a process to derive a channel estimate with pilot weighting.

FIG. 5A shows a process 500 to derive a channel estimate with pilot weighting. A receiver receives at least one transmission symbol for a pilot transmitted by a transmitter (block 512). Each transmission symbol may be generated with a single-carrier multiplexing scheme (e.g., IFDMA, LFDMA or EFDMA) or a multi-carrier multiplexing scheme (e.g., OFDMA). The receiver removes the cyclic prefix and performs a DFT/FFT on each received transmission symbol to obtain received pilot values for pilot subbands (block 514). The receiver may estimate the reliability of the received pilot values, e.g., based on an interference estimate for the pilot subbands and/or other information (block 516). The receiver determines the weights for the received pilot values based on the transmitted pilot values, the estimated reliability of the received pilot values, other information, or a combination thereof (block 518). The receiver derives a channel estimate based on the received pilot values and the weights (block 520). This channel estimate may be a channel impulse response estimate and/or a channel frequency response estimate. The receiver may derive the channel estimate using the least-squares technique, the MMSE technique, or some other channel estimation technique. The receiver may iteratively perform channel and interference estimation. If pilot and data are transmitted on different subbands, then the receiver may derive a channel estimate for the data subbands based on the channel estimate for the pilot subbands (e.g., as shown in equation (8)) or based on the received pilot values and the weights (e.g., as shown in equation (13) or (14)).

The receiver then performs data detection (e.g., equalization, match filtering, or receiver spatial processing) on received data values with the channel estimate (block 522). For example, the receiver may perform equalization in the frequency domain based on the MMSE technique, as follows:

$$Z_d(k) = \frac{R_d(k) \cdot \hat{H}*(k)}{|\hat{H}(k)|^2 + \hat{N}_0}, \quad \text{Eq (19)}$$

for $k \in K_d$, where $R_d(k)$ is a received data value for subband k, $Z_d(k)$ is a detected data value for subband k, and $K_d$ is the set of data subbands. The interference estimate $\hat{N}_0$ in equation (18) may be obtained by averaging the estimated interference powers for the pilot subbands, as follows:

$$\hat{N}_0 = \frac{1}{P} \cdot \sum_{k \in K_p} \hat{I}(k). \quad \text{Eq (20)}$$

Figure 5B:
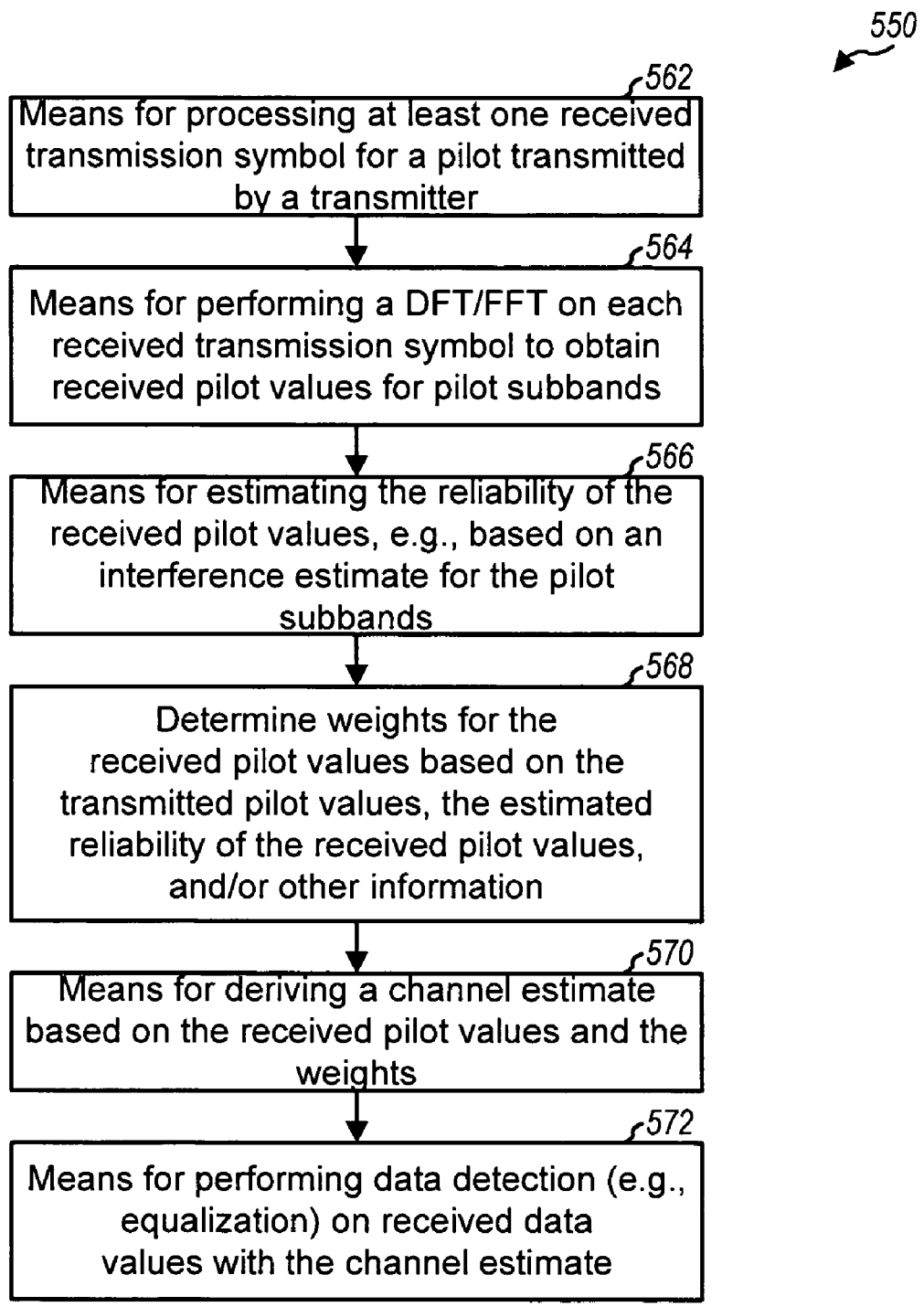
FIG. 5B shows an apparatus to derive a channel estimate with pilot weighting.

FIG. 5B shows an apparatus 500 to derive a channel estimate with pilot weighting. Means 562 for processing receiver receives at least one transmission symbol for a pilot transmitted by a transmitter. Each transmission symbol may be generated with a single-carrier multiplexing scheme (e.g., IFDMA, LFDMA or EFDMA) or a multi-carrier multiplexing scheme (e.g., OFDMA). Means 562 may be coupled with means 564 for performing a DFT/FFT, or a similar functionality, on each received transmission symbol to obtain received pilot values for pilot subbands. In certain aspects, means 562 and 564 may be embodied as a single means. Means 564, or 562, may be coupled with means 566 for estimating the reliability of the received pilot values, e.g., based on an interference estimate for the pilot subbands and/or other information. Means 566 may be coupled with means 568 for determining the weights for the received pilot values based on the transmitted pilot values, the estimated reliability of the received pilot values, other information, or a combination thereof. In certain aspects, means 566 may be part of means 568, or may be omitted from the apparatus and means 568 may be coupled with means 564 or 562, depending on their structure.

Means 568 is coupled with means 570 for deriving a channel estimate based on the received pilot values and the weights. This channel estimate may be a channel impulse response estimate and/or a channel frequency response estimate. The receiver may derive the channel estimate using the least-squares technique, the MMSE technique, or some other channel estimation technique. The receiver may iteratively perform channel and interference estimation. If pilot and data are transmitted on different subbands, then the receiver may derive a channel estimate for the data subbands based on the channel estimate for the pilot subbands (e.g., as shown in equation (8)) or based on the received pilot values and the weights (e.g., as shown in equation (13) or (14)).

Means 570 may be coupled with means 572 for performing data detection (e.g., equalization, match filtering, or receiver spatial processing) on received data values with the channel estimate. In certain aspects means 572 may be omitted from the apparatus, and performed in other structures of a receiver.

Figure 6:
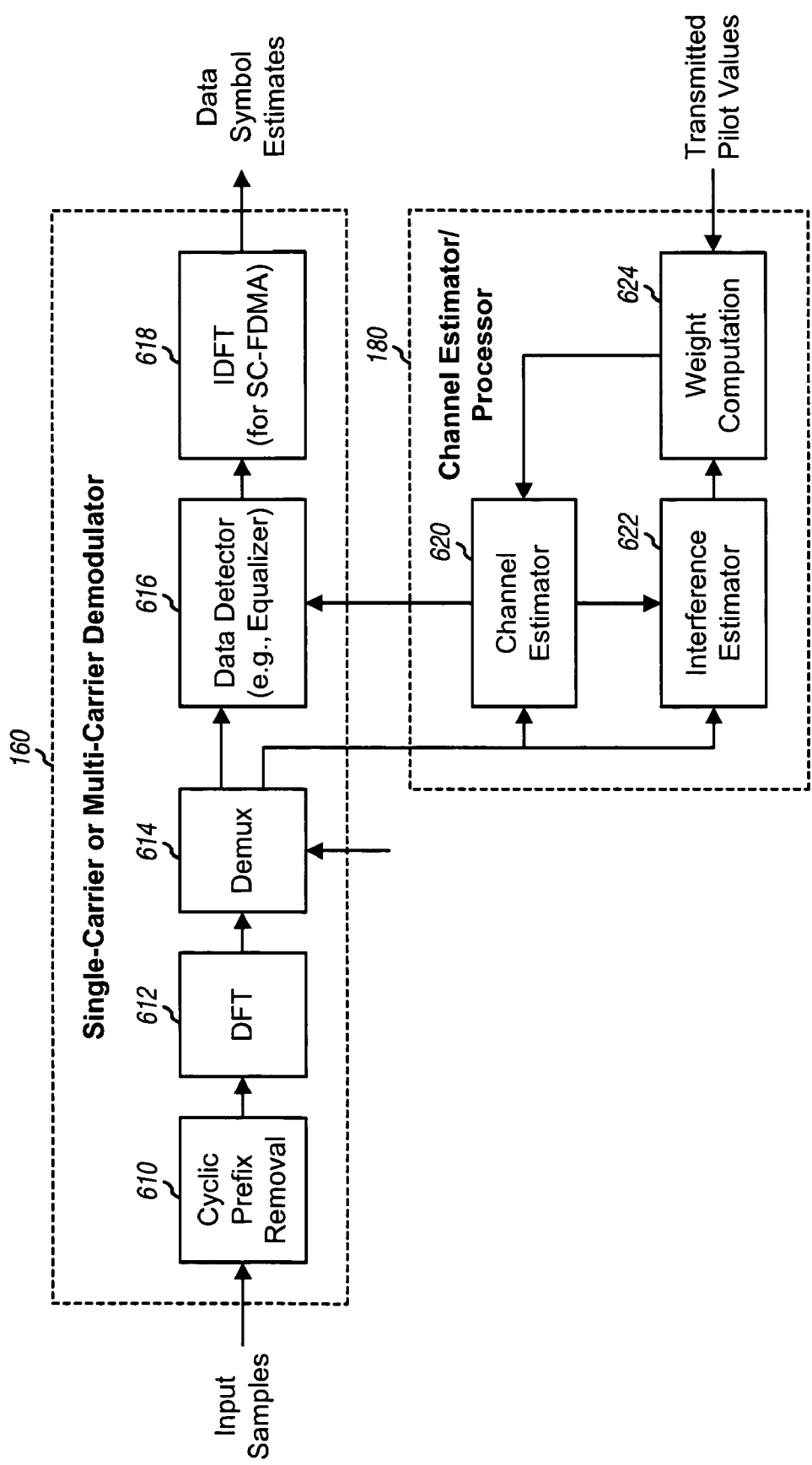
FIG. 6 shows a block diagram of a demodulator and a channel estimator processor at the receiver.

FIG. 6 shows an embodiment of demodulator 160 and channel estimator/processor 180 at receiver 150 in FIG. 1. Within demodulator 160, a cyclic prefix removal unit 610 receives input samples for transmission symbols received by receiver 150 and removes the cyclic prefix in each received transmission symbol. A DFT unit 612 performs a DFT or an FFT on the input samples for each received transmission symbol and provides frequency-domain received values. A demultiplexer (Demux) 614 provides received data values from data subbands to a data detector 616 and provides received pilot values from pilot subbands to channel estimator/processor 180. The operation of demultiplexer 614 is controlled by a control signal, e.g., from controller/processor 190.

Within channel estimator/processor 180, an interference estimator 622 derives an interference estimate based on the received pilot values and possibly a channel estimate from a channel estimator 620. A weight computation unit 624 computes the weights for the received pilot values based on the transmitted pilot values and/or the interference estimate. Channel estimator 620 derives the channel estimate based on the received pilot values and the weights. The channel and interference estimation may be performed iteratively. After completion of the channel estimation, channel estimator 620 provides the channel estimate to data detector 616.

Data detector 616 may perform frequency-domain equalization on the received data values with the channel estimate (e.g., as shown in equation (18)) and provide detected data values. Data detector 616 may also perform time-domain equalization or some other type of data detection. If the transmission symbols are sent with SC-FDMA, then an IDFT unit 618 performs an IDFT or an IFFT on the detected data values for each symbol period and provides data symbol estimates. If the transmission symbols are sent with MC-FDMA, then data detector 616 provides the detected data values as the data symbol estimates.

The data symbol estimates are further processed to obtain decoded data. For example, log likelihood ratios (LLRs) may be derived based on the data symbol estimates, the channel estimate, and the interference estimate. Each modulation symbol is formed with B bits, where $B \geq 1$. An LLR is computed for each bit of a transmitted modulation symbol based on the corresponding data symbol estimate, channel gain estimate, and estimated interference power. The LLR for each bit indicates the confidence in that bit and hence determines the weight given to that bit in the decoding process. The interference estimate may take into account the noise in the channel estimate, so that data subbands with more noisy channel gain estimates and hence higher interference powers are given less weight in the LLRs computation. The LLRs are deinterleaved and decoded to obtain the decoded data.

The pilot transmission and channel estimation techniques described herein may be implemented by various means. For example, these techniques may be implemented in hardware, software, or a combination thereof. For a hardware implementation, the processing units used for pilot transmission at a transmitter (e.g., TX data and pilot processor 120 in FIG. 1) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units used for channel estimation at a receiver (e.g., demodulator 160 and/or channel estimator/processor 180 in FIGS. 1 and 6) may also be implemented within one or more ASICs, DSPs, processors, and so on.

For a software implementation, the techniques may be implemented with modules (e.g., procedures, functions, and so on) that perform the functions described herein. The software codes may be stored in a memory (e.g., memory 142 or 192 in FIG. 1) and executed by a processor (e.g., processor 140 or 190). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
a processor operative to process a pilot received from a transmitter, to obtain received pilot values, to estimate reliability of the received pilot values using an interference estimate derived from pilot subbands, to determine weights for the received pilot values based on the estimated reliability of the received pilot subband values, and to derive a channel estimate for the transmitter based on the received pilot subband values and the weights:
wherein the processor is operative to derive an interference estimate based on the received pilot values, to derive data symbol estimated by processing received data values with the channel estimate, and to derive log likelihood ratios (LLRs) based on the data symbol estimates, the channel estimate, and the interference estimate; and
a memory coupled to the processor.

2. The apparatus of claim 1, wherein the processor is operative to receive at least one transmission symbol for the pilot and to perform a discrete Fourier transform (DFT) or a fast Fourier transform (FFT) on each of the at least one received transmission symbol to obtain the received pilot values.

3. The apparatus of claim 1, wherein the processor is operative to determine pilot values transmitted by the transmitter and to determine the weights for the received pilot values based on the transmitted pilot values.

4. The apparatus of claim 3, wherein the pilot comprises multiple modulation symbols sent in the time domain, and wherein the transmitted pilot values are discrete Fourier transform (DFT) of the multiple modulation symbols for the pilot.

5. The apparatus of claim 1, wherein the processor is operative to derive an interference estimate based on the received pilot values and to estimate the reliability of the received pilot values based on the interference estimate.

6. The apparatus of claim 1, wherein the processor is operative to estimate interference powers for multiple frequency subbands based on the received pilot values and to estimate the reliability of the received pilot values based on the estimated interference powers.

7. The apparatus of claim 1, wherein the processor is operative to determine pilot values transmitted by the transmitter, to estimate reliability of the received pilot values, and to determine the weights for the received pilot values based on the transmitted pilot values and the estimated reliability of the received pilot values.

8. The apparatus of claim 1, wherein the processor is operative to derive the channel estimate based on a least squares technique or a minimum mean square en⁻ or (MMSE) technique.

9. The apparatus of claim 1, wherein the processor is operative to derive an interference estimate based on the received pilot values and the channel estimate, to derive the channel estimate based on the received pilot values, the weights, and the interference estimate, and to derive the interference estimate and the channel estimate for multiple iterations.

10. The apparatus of claim 1, wherein the processor is operative to derive a second channel estimate for frequency subbands used for data transmission based on the received pilot values and the weights.

11. The apparatus of claim 1, wherein the processor is operative to perform equalization on received data values with the channel estimate.

12. The apparatus of claim 1, wherein the processor is operative to receive at least one transmission symbol for the pilot, each transmission symbol being generated with a single-carrier multiplexing scheme and comprising multiple modulation symbols sent in the time domain.

13. The apparatus of claim 12, wherein each transmission symbol is generated with interleaved frequency division multiple access (IFDMA), localized frequency division multiple access (LFDMA), or enhanced frequency division multiple access (EFDMA).

14. The apparatus of claim 1, wherein the processor is operative to receive at least one transmission symbol for the pilot, each transmission symbol being generated with a multi-carrier multiplexing scheme and comprising multiple modulation symbols sent in the frequency domain.

15. The apparatus of claim 14, wherein each transmission symbol is generated with orthogonal frequency division multiple access (OFDMA).

16. A method comprising:
processing a pilot received from a transmitter to obtain received pilot values;
estimating reliability of the received pilot values using an interference estimate derived from pilot subbands;
determining weights for the received pilot values based on the transmitted pilot values and the estimated reliability of the received pilot subband values;
deriving a channel estimate for the transmitter based on the received pilot subband values and the weights; and
deriving an interference estimate based on the received pilot values, to derive data symbol estimates by processing received data values with the channel estimate, and to derive log likelihood ratios (LLRs) based on the data symbol estimates, the channel estimate, and the interference estimate.

17. The method of claim 16, wherein the determining the weights for the received pilot values comprises:
determining pilot values transmitted by the transmitter;
determining the weights for the received pilot values based on the transmitted pilot values;
estimating reliability of the received pilot values, and
determining the weights for the received pilot values based on the estimated reliability of the received pilot values.

18. The method of claim 16, wherein the determining the weights for the received pilot values comprises:
deriving an interference estimate based on the received pilot values;
estimating the reliability of the received pilot values based on the interference estimate, and
determining the weights for the received pilot values based on the estimated reliability of the received pilot values.

19. The method of claim 16, further comprising: performing equalization on received data values with the channel estimate.

20. A method comprising:
receiving at least one transmission for a pilot from a transmitter, each transmission symbol being generated with a single-carrier multiplexing scheme or a multi-carrier multiplexing scheme;
performing a discrete Fourier transform (DFT) or a fast Fourier transform (FFT) on each of the at least one received transmission symbol to obtain received pilot values;
estimating reliability of the received pilot values using an interference estimate derived from pilot subbands;
determining weights for the received pilot values based on pilot values transmitted by the transmitter and the estimated reliability of the received pilot subband values;
deriving a channel estimate for the transmitter based on the received pilot subband values and the weights, and
performing data detection on received data values with the channel estimate, by
deriving log likelihood ratios (LLRs) based on the data symbol estimates, the
channel estimate, and the interference estimate.

21. An apparatus comprising:
means for processing a pilot received from a transmitter to obtain received pilot values;
means for estimating reliability of the received pilot values using an interference estimate derived from pilot subbands;
means for determining weights for the received pilot values based on the estimated reliability of the received pilot subband values, and
means for deriving a channel estimate for the transmitter based on the received subband pilot values and the weights; and
processor means operative to derive an interference estimate based on the received pilot values, to derive data symbol estimates by processing received data values with the channel estimate, and to derive log likelihood ratios (LLRs) based on the data symbol estimates, the channel estimate, and the interference estimate.

22. The apparatus of claim 21, wherein the means for determining the weights for the received pilot values comprises:
means for determining pilot values transmitted by the transmitter, and
means for determining the weights for the received pilot values based on the transmitted pilot values.

23. The apparatus of claim 21, wherein the means for determining the weights for the received pilot values comprises
means for deriving an interference estimate based on the received pilot values; means for estimating the reliability of the received pilot values based on the interference estimate, and means for determining the weights for the received pilot values based on the estimated reliability of the received pilot values.

24. The apparatus of claim 21, wherein the means for determining the weights for the received pilot values comprises:
means for determining pilot values transmitted by the transmitter;
means for estimating reliability of the received pilot values, and means for determining the weights for the received pilot values based on the transmitted pilot values and the estimated reliability of the received pilot values.

25. The apparatus of claim 21, further comprising: means for performing equalization on received data values with the channel estimate.

26. An apparatus comprising:
a processor operative to form a sequence of channel estimation modulation symbols for a pilot and to generate at least one transmission symbol for the sequence of modulation symbols based on a single-carrier multiplexing scheme, wherein the sequence of modulation symbols is sent in time domain and has a non-flat frequency response;
wherein processor means operative to derive an interference estimate based on the received pilot values, to derive data symbol estimates by processing received data values with the channel estimate, and to derive log likelihood ratios (LLRs) based on the data symbol estimates, the channel estimate, and the interference estimate; and
a memory coupled to the processor.

27. The apparatus of claim 26, wherein the processor is operative to generate the at least one transmission symbol based on an interleaved frequency division multiple access (IFDMA) scheme, a localized frequency division multiple access (LFDMA) scheme, or an enhanced frequency division multiple access (EFDMA) scheme.

28. The apparatus of claim 26, wherein the processor is operative to perform a discrete Fourier transform (DFT) or a fast Fourier transform (FFT) on the sequence of modulation symbols to obtain multiple frequency-domain pilot values and to send the multiple frequency-domain pilot values on multiple frequency subbands used for transmitting the pilot.

29. A method comprising:
forming a sequence of channel estimation modulation symbols for a pilot, the sequence of modulation symbols being sent in time domain and having a non-flat frequency response;
generating at least one transmission symbol for the sequence of modulation symbols based on a single-carrier multiplexing scheme wherein the transmission symbol is adapted to be transmitted by a transmitter; and
deriving an interference estimate based on the received pilot values, to derive data symbol estimated by processing received data values with the channel estimate, and to derive log likelihood ratios (LLRs) based on the data symbol estimates, the channel estimate, and the interference estimate.

30. The method of claim 29, wherein the generating the at least one transmission symbol comprises:
generating the at least one transmission symbol for the sequence of modulation symbols based on an interleaved frequency division multiple access (IFDMA) scheme, a localized frequency division multiple access (LFDMA) scheme, or an enhanced frequency division multiple access (EFDMA) scheme.

31. An apparatus comprising:
means for forming a sequence of channel estimation modulation symbols for a pilot, the sequence of modulation symbols being sent in time domain and having a non-flat frequency response,
means for generating at least one transmission symbol for the sequence of modulation symbols based on a single-carrier multiplexing scheme wherein the transmission symbol is adapted to be transmitted by a transmitter; and
means to derive an interference estimate based on the received pilot values, to derive data symbol estimates by processing received data values with the channel estimate, and to derive log likelihood ratios (LLRs) based on the data symbol estimates, the channel estimate, and the interference estimate.

32. The apparatus of claim 31, wherein the means for generating the at least one transmission symbol comprises:
means for generating the at least one transmission symbol for the sequence of modulation symbols based on an interleaved frequency division multiple access (IFDMA) scheme, a localized frequency division multiple access (LFDMA) scheme, or an enhanced frequency division multiple access (EFDMA) scheme.

33. An apparatus comprising:
a demodulator including a demultiplexer, said demultiplexer being operable to provide received pilot values from received pilot subbands; and
a processor, coupled to the demodulator, being operable to estimate the reliability of the received pilot values using an interference estimate derived from the received pilot values, said processor being further operable to determine weights for the received pilot values based on the estimated reliability of the received pilot values, said processor being additionally operable to derive a channel estimate for the transmitter based on weighted pilot values.

34. An apparatus as recited in claim 33 wherein the processor is operable to derive log likelihood ratios (LLRs) based on the data symbol estimates.

* * * * *